Patented June 17, 1941

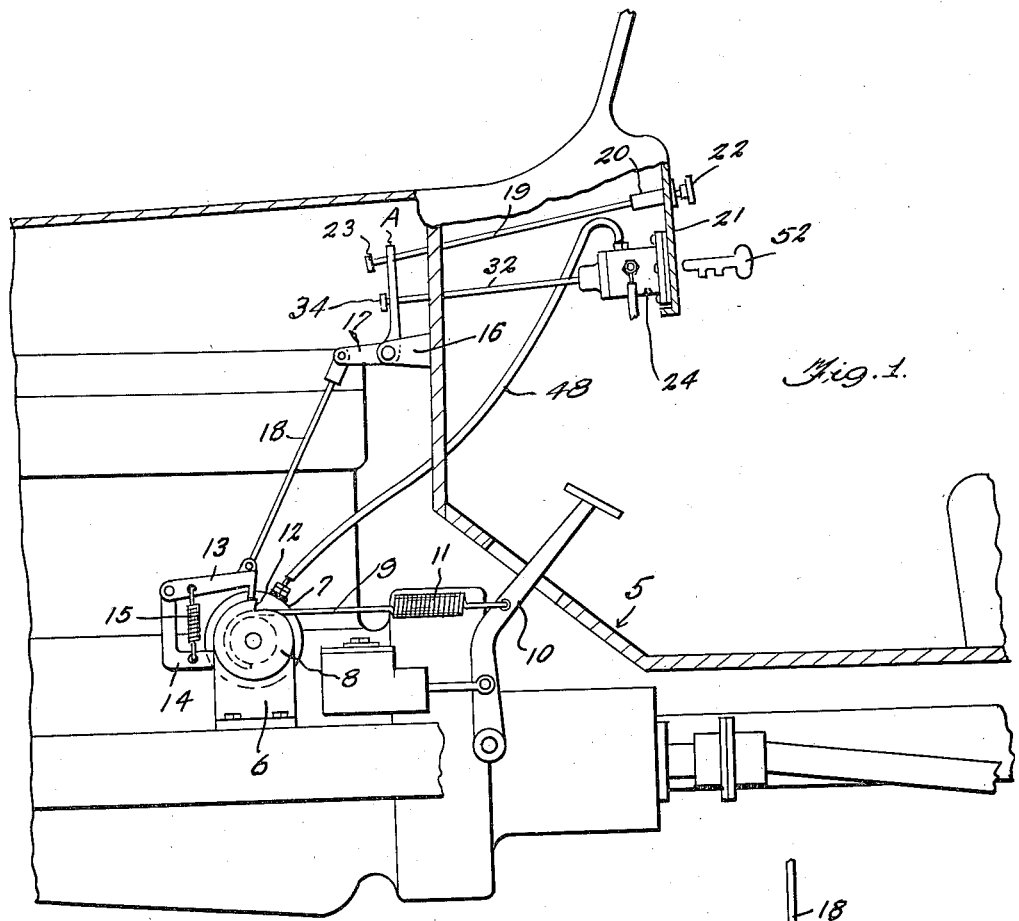
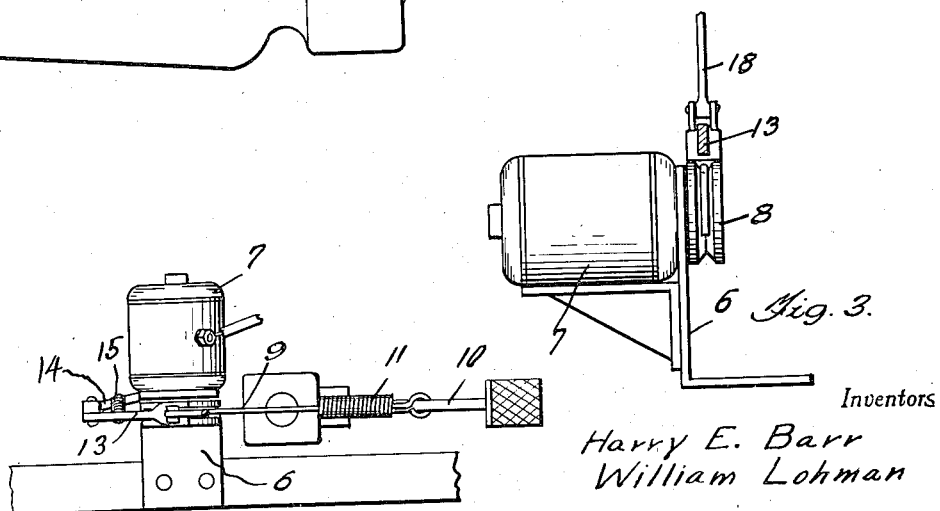

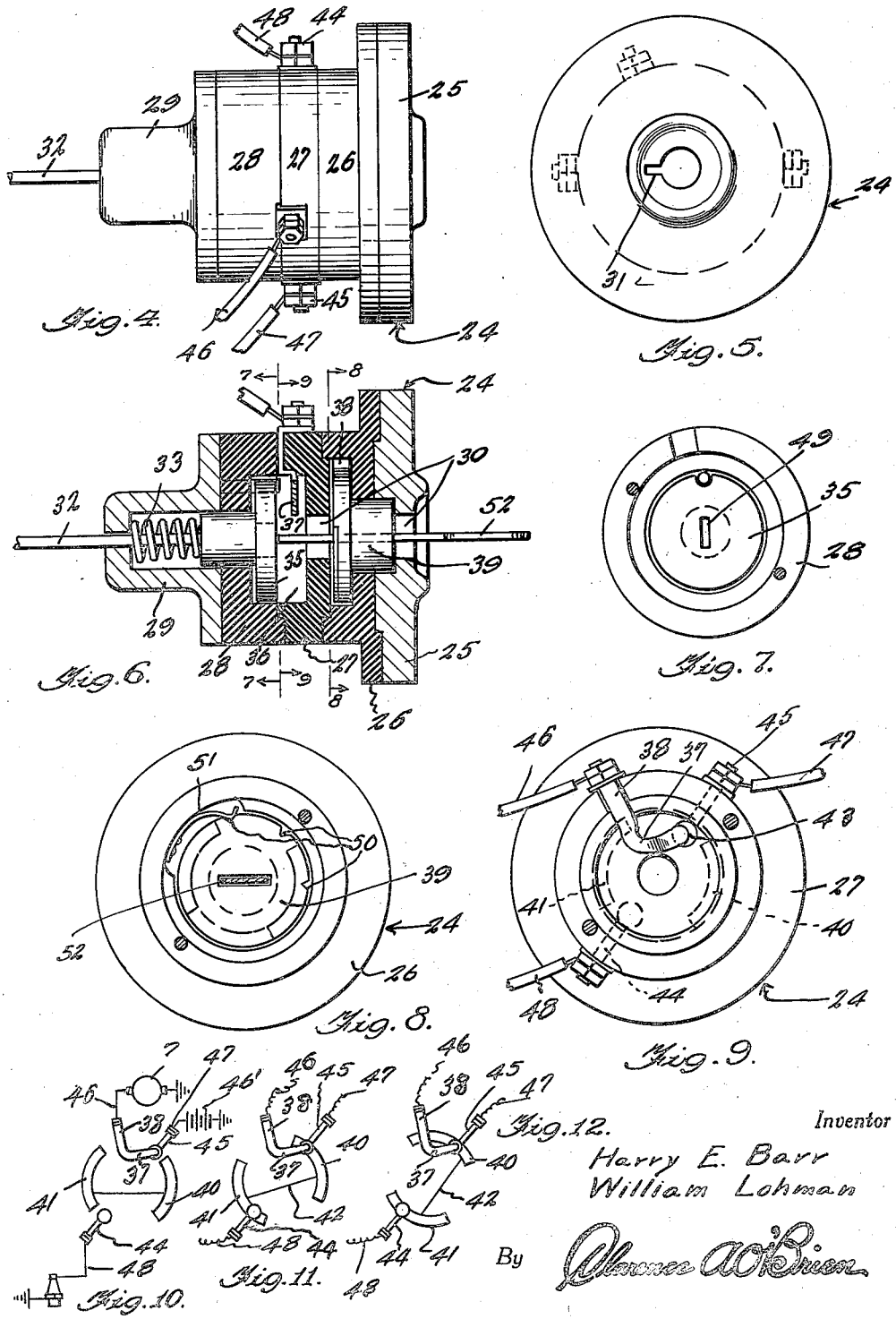

2,245,958

UNITED STATES PATENT OFFICE 2,245,958

BRAKE APPLYING DEVICE FOR AUTOMOBILES

Harry E. Barr and William Lohman, Wheeling, W. Va., assignors of one-fourth to Frank P. Marchlenski and one-fourth to Louis Marchlenski, both of Wheeling, W. Va.

Application August 2, 1940, Serial No. 349,818

3 Claims. (Cl. 192—3)

This invention relates to a brake applying device for automobiles, and has for the primary object the provision of a device of this character which will automatically apply the brakes of an automobile whenever the engine of the automobile is stopped by turning off the ignition of the engine, so that there will be practically no possibility of the automobile moving down grade when left unattended and causing accidents thereby and includes means whereby the driver may release the brakes whenever desired or prior to or after starting the engine of the automobile and also, if desired, the driver may bring about applying of the brakes by the device and still leave the engine running which may be desirable when quick deliveries are to be made from the automobile.

With these and other objects in view as will become more apparent as the description proceeds, the invention consists in certain novel features of construction, combination and arrangement of parts as will be more fully described and claimed.

For a complete understanding of our invention, reference is to be had to the following description and accompanying drawings, in which Figure 1 is a fragmentary vertical sectional view illustrating a portion of an automobile equipped with a brake applying device constructed in accordance with our invention.

Figure 2 is a fragmentary top plan view illustrating the brake applying mechanism showing the latter connected to a brake pedal of the automobile and includes an electric motor in its construction.

Figure 3 is a side elevation, partly in section, illustrating the electric motor and the grooved pulley connected thereto on which may be wound by the operation of the electric motor the cable employed in the actuation of the brake pedal by the present invention.

Figure 4 is a side elevation illustrating a switch for the control of the electric motor and the ignition of the automobile.

Figure 5 is an end elevation illustrating the key receiving slot of the switch.

Figure 6 is a vertical sectional view illustrating the switch.

Figure 7 is a transverse sectional view taken on the line 7—7 of Figure 6.

Figure 8 is a transverse sectional view taken on the line 8—8 of Figure 6.

Figure 9 is a transverse sectional view taken on the line 9—9 of Figure 6.

Figure 10 is a diagrammatical view illustrating the position of the contacts of the switch when the latter is in ignition breaking position.

Figure 11 is a view similar to Figure 10 showing the contacts in position of closing the ignition.

Figure 12 is a view similar to Figure 11 illustrating the position of the contacts when the ignition is closed for allowing the engine to run while the brakes are in applied position.

Referring in detail to the drawings, the numeral 5 indicates a fragmentary portion of an automobile and showing such parts that the present invention is associated with. Mounted on the frame of the automobile within the engine compartment is a bracket 6 for supporting an electric motor 7 which is equipped with a grooved pulley 8. Secured to and adapted to be wound on the pulley 8 is a cable 9 connected to the brake pedal 10 or some other part of the braking apparatus of the automobile and includes in its construction a coil spring 11.

The periphery of the pulley 8 is provided with a notch to form a keeper 12 for a pivotally mounted spring influenced latch element 13. The latch element is pivotally mounted on a bracket 14 carried by the bracket 6 and the latch element is caused to ride the periphery of the pulley 8 by the action of a coil spring 15 connected thereto and to the bracket 14.

Mounted on the automobile within the engine compartment above the motor 7 is a bracket 16 to which is pivotally connected a bell crank lever 17, one arm of which has pivoted thereto a connecting link 18. The other end of the connecting link is pivotally connected to the latch element 13. The other arm portion of the bell crank lever, designated by the character A, has a pair of openings, one of which slidably receives an operating rod 19 which extends through a suitable fixture 20 on the instrument board or panel 21 of the automobile and is equipped with a finger piece 22. The other end of the actuating rod 19 is provided with a stop 23 for the purpose of preventing the actuating rod from being drawn through the opening of the bell crank lever when pulled upon. By pulling on the actuating rod, the bell crank lever can be rocked on its pivot for the purpose of disengaging the latch element 13 from the keeper 12 when desiring to free or release the brakes of the automobile.

Mounted on the instrument board 21 is a switch 24, including sections 25, 26, 27, 28 and 29. A bore 30 is formed in the sections of the switch and opens outwardly through the section 25 in the form of a key slot 31. The section 25 of the switch provides a face plate while the section 29 provides a cap and a slidable support for an operating rod 32 as well as a mounting for a coil spring 33 acting to urge the operating rod 32 in one direction. The operating rod extends through one of the openings of the arm portion A of the bell crank lever and has secured thereon a stop 34. The other end of the operating rod 32 has secured thereon a head 35 slidably mounted in a contact chamber 36 formed by recessing the opposing faces of the sections 27 and 28 of the switch. The action of the spring 33 is to urge the head 35 to the right in Figure 6 for the purpose of flexing a contact 37 mounted in the contact chamber 36 and connected to a binding post 38 extending exteriorly of the switch.

The sections 26, 27 and 28 of the switch are constructed of insulated material and the section 26 has a recess to form a contact chamber 38. Operating in the contact chamber 38 and a portion of the bore 30 is a key barrel 39. The key barrel or the portion thereof which operates in the contact chamber 38 carries contacts 40 and 41 electrically connected, as shown at 42.

A contact 43 enters the contact chambers 36 and 38 and is carried by the section 27 to be engaged by the contact 37 when the latter is flexed by the movement of the operating rod 32 to the right in Figure 6. The operating rod 32 is moved to the left in Figure 6 by the movement of the bell crank lever A caused by the latch element moving into engagement with the keeper for the purpose of breaking the electric circuit to the electric motor 7 after the application or applying of the brakes and which will be hereinafter more fully described. The spring 33 acts to move the rod 32 to the right in Figure 6 for the purpose of engaging the contact 37 with the contact 43 for the purpose of completing the electric circuit to the electric motor.

The contact 41 coacts with a terminal post 44 extending exteriorly of the switch 24 and the contact 40 coacts with a terminal post 45 extending exteriorly of the switch. The contacts 41 and 40 may be engaged and disengaged from said terminal posts 44 and 45 by actuating the switch through the use of a key 52 in the lock barrel 39.

An electric conductor 46 connects the post 38 to the electric motor 7 which is electrically grounded on the automobile. The post 45 is electrically connected to the storage battery 46' of the automobile, as shown in Figure 10. The terminal post 44 is connected to the ignition system of the engine of the automobile by a conductor 48. The contact 43 is electrically connected to the terminal post 45. The conductor which connects the terminal post 45 to the battery 46' is indicated by the character 47.

The head 35 of the operating rod 32 has a key slot 49 formed therein.

The key barrel 39 has formed therein three notches, indicated by the character 50, and mounted in the section 26 or the contact chamber 38 thereof is a spring dog 51 for riding into and out of the notches 50. The notches are for the purpose of indicating the positions of the contacts of the switch so that the operator when actuating the switch by the key 52 may readily determine by feel when the several contacts heretofore described are moved to engage.

When the key is removed from the key barrel, the latter must be turned so that the contacts 40 and 41 are disengaged from the terminal posts 45 and 44 which breaks the ignition circuit of the engine.

To close the ignition circuit of the engine, the key is inserted in the key barrel to rotate the latter to bring the contacts 40 and 41 into engagement with the terminal posts 45 and 44. The current from the battery may then flow to the spark plugs of the engine as clearly shown in Figure 11. At this time the contact 40 also moves into engagement with the contact 43. When the key is inserted in the key barrel for the purpose of closing the ignition circuit it engages with the head 35 and imparts movement to the operating rod 32 to the left in Figure 6 against the action of the spring 33 and retains the operating rod in this position as long as the key remains in the position of closing the ignition circuit. However, when the key is removed to break the ignition circuit, the spring 33 shoves the operating rod 32 to the right in Figure 6 so that the head 35 thereof flexes the contact 37 against the contact 43 completing the electric circuit to the motor 7. As soon as the electric motor circuit is completed, the cable 9 winds on the pulley 8 and applies the brakes. After the pulley has made a part of a revolution sufficient to bring about the application of the brakes, the latch element drops into engagement with the keeper 12 rocking the bell crank lever on its pivot to the left in Figure 1 throwing the operating rod 32 against the action of the spring and permitting the contact 37 to flex away from the contact 43 and thereby break the circuit to the electric motor.

It is to be understood that after the brakes have been applied the operator may, at any time desired, release the brakes by pulling on the operating rod 19 to disengage the latch element 13 from the keeper 12, the brakes releasing under their own spring mechanism which brings about unwinding of the cable 9 from the pulley.

Should the driver of the automobile desire to leave the automobile engine running and to bring about application of the brakes so that the automobile can be left unattended for the purpose of making a quick delivery from the automobile without the danger of the latter rolling down grade, the key is turned so as to move the contacts 40 and 41 from the position shown in Figure 11 to the position shown in Figure 12. With the key in the position to bring about the movement of the contacts 40 and 41, as shown in Figure 12, the key then may be moved inwardly to a greater distance by entering the key slot 49 of the head 35 which will permit the spring 33 to move the rod 32 to the right in Figure 6 and the head 35 into engagement with the contact 37 and flex the latter into engagement with the contact 43 completing the electric circuit to the motor 7 to bring about the application of the brakes. As soon as the brakes are applied and the latch element 13 engages with the keeper 12, the bell crank lever imparts movement to the operating rod 32 to the left in Figure 6 which disengages the head 35 from the contact 37, permitting the latter to flex away from the contact 43 and thereby break the circuit to the motor 7.

The foregoing description is thought to give a clear understanding as to the construction and operation of this invention and it will be seen therefrom and with reference to the drawings that applicant has devised a simple, practical and efficient device for automatically applying the brakes of the automobile whenever the ignition switch is positioned to break the ignition circuit of the automobile for the stopping of the engine or can bring about application of the brakes by actuating the key of the switch into a position which will permit the automatic application of the brakes with the engine still running.

While we have shown and described the preferred embodiment of our invention, it will be understood that minor changes in construction, combination and arrangement of parts may be made without departing from the spirit and scope of the invention as claimed.

Having thus described our invention, what we claim is:

1. In combination with an automobile having brakes and an ignition circuit, an electric operating means connected to the brakes for the application and release of the latter, a switch electrically connected in the ignition circuit and electrically connected to said electric operating means for making and breaking the ignition circuit, and mechanical means connected to said switch and to said electric operating means for cooperation with said switch when the latter is operated to break the ignition circuit to complete the circuit to said electric operating means to bring about application of the brakes thereby and to automatically break the circuit to said electric operating means after the application of the brakes, said switch including means for completing the circuit to said electric operating means when the switch is moved to maintain the ignition circuit closed for the purpose of maintaining the engine of the automobile running with the brakes applied.

2. In a brake applying device for automobiles, an electric motor mounted on an automobile, a pulley secured to the electric motor, a cable secured to said pulley and connected with brakes of the automobile and adapted to be wound on the drum during the operation of the motor to bring about application of the brakes, a keeper formed on said pulley, a spring influenced pivotally mounted latch to coact with said keeper for securing the brakes applied, a switch electrically connected to said motor and electrically connected in an ignition circuit of the automobile for the making and breaking of the ignition circuit, a bell crank lever operatively connected to said latch, a hand operated means connected to the bell crank lever to effect pivotal movement thereof for disengaging the latch element from the keeper to free the brakes, a switch operating means connected to the bell crank lever to bring about closing of the circuit to the electric motor by the switch on the latch element engaging said keeper on the full application of the brakes.

3. In a brake applying device for automobiles, an electric motor mounted on an automobile, a pulley secured to the electric motor, a cable secured to said pulley and connected with brakes of the automobile and adapted to be wound on the drum during the operation of the motor to bring about application of the brakes, a keeper formed on said pulley, a spring influenced pivotally mounted latch to coact with said keeper for securing the brakes applied, a switch electrically connected to said motor and electrically connected in an ignition circuit of the automobile for the making and breaking of the ignition circuit, a bell crank lever operatively connected to said latch, a hand operated means connected to the bell crank lever to effect pivotal movement thereof for disengaging the latch element from the keeper to free the brakes, a spring influenced rod connected to said bell crank lever and to said switch to bring about closing of the circuit to the electric motor when the switch is operated to break the ignition circuit and to automatically break the circuit to the motor on the latch element engaging the keeper on the full application of the brakes.

HARRY E. BARR.
WILLIAM LOHMAN.